US 7,933,242 B2

(12) United States Patent
Kolding et al.

(10) Patent No.: US 7,933,242 B2
(45) Date of Patent: Apr. 26, 2011

(54) FAST BEARER PRIORITIZATION IN A SCHEDULER USING ACTIVITY DETECTION

(75) Inventors: Troels Kolding, Klarup (DK); Daniela Laselva, Aalborg (DK); Jens Steiner, Klarup (DK); Klaus Pedersen, Aalborg (DK); Jeroen Wigard, Klarup (DK)

(73) Assignee: Nokia Corporation, Espoo (FI)

( * ) Notice: Subject to any disclaimer, the term of this patent is extended or adjusted under 35 U.S.C. 154(b) by 347 days.

(21) Appl. No.: 12/075,919

(22) Filed: Mar. 14, 2008

(65) Prior Publication Data

US 2008/0225729 A1    Sep. 18, 2008

Related U.S. Application Data

(60) Provisional application No. 60/918,349, filed on Mar. 15, 2007.

(51) Int. Cl.
*H04W 4/00* (2009.01)
(52) U.S. Cl. ................................. 370/329; 370/338
(58) Field of Classification Search .......... 370/229–235, 370/328, 329, 337, 338, 347, 431, 442, 395.443; 455/343.4, 453
See application file for complete search history.

(56) References Cited

U.S. PATENT DOCUMENTS

| 2003/0002490 | A1* | 1/2003 | Wong et al. ............... 370/355 |
| 2005/0114895 | A1* | 5/2005 | Ismail et al. ............... 725/81 |
| 2007/0053331 | A1  | 3/2007 | Kolding et al. ............. 370/338 |
| 2007/0218918 | A1* | 9/2007 | Liu et al. ................. 455/452.1 |
| 2007/0265017 | A1* | 11/2007 | Ishii et al. ............... 455/453 |
| 2008/0002712 | A1* | 1/2008 | Ji et al. .................. 370/395.4 |
| 2008/0008203 | A1* | 1/2008 | Frankkila et al. ........... 370/412 |
| 2008/0165793 | A1* | 7/2008 | Abel et al. ................ 370/412 |

OTHER PUBLICATIONS

"QoS-Aware Proportional Fair Packet Scheduling with Required Activity Detection", T. Kolding, IEEE Sep. 1, 2006, pp. 1-5.
"RANO7 MAC-hs Packet Scheduling Considerations", Klaus Ingemann Pedersen, RANO7 PS ALGS V15, 34 pgs.

* cited by examiner

*Primary Examiner* — Ricky Ngo
*Assistant Examiner* — Kan Yuen
(74) *Attorney, Agent, or Firm* — Harrington & Smith

(57) ABSTRACT

Apparatus, methods and computer program products provide fast instantaneous overload control during scheduling operations involving users in a wireless communications network who are candidates to be scheduled in a next transmission time interval. Apparatus detect congestion conditions in a wireless communications network by determining an instantaneous operating region of a scheduler (e.g., a medium access control-high speed scheduler) based on required activity detection and prioritize users in a scheduling candidate set based on the cost of a user. In a variant, this may be implemented by combining part of the required activity detection algorithm with a per-bearer cost function. In one implementation, this will limit the number of users that suffer during momentary congestion in the wireless communications network.

30 Claims, 4 Drawing Sheets

FAST BEARER PRIORITIZATION IN A SCHEDULER USING ACTIVITY DETECTION

CROSS REFERENCE TO A RELATED UNITED STATES PATENT APPLICATION

This application hereby claims priority under 35 U.S.C. §119(e) from copending provisional U.S. Patent Application No. 60/918,349 entitled "METHOD OF FAST BEARER PRIORITIZATION IN MAC-HS PACKET SCHEDULER BASED ON REQUIRED ACTIVITY DETECTION" filed on Mar. 15, 2007 by Troels Kolding, Daniela Laselva, Jens Steiner, Klaus Pedersen and Jeroen Wigard. This preceding provisional application is hereby incorporated by reference in its entirety as if fully restated herein.

TECHNICAL FIELD

The exemplary and non-limiting embodiments of this invention relate generally to wireless communication systems, methods, devices and computer program products and, more specifically, relate to techniques for scheduling resources to user equipment.

BACKGROUND

The MAC-hs (medium access control-high speed) packet scheduler can operate in two different regions.

Feasible load region: The MAC-hs packet scheduler is able to fulfill the guaranteed bit rate (GBR) requirements for all the allocated High-Speed Downlink Packet Access (HSDPA) users in the cell. Note that the GBRs can be interpreted as minimum target bit rate for some users, like best effort users.

Congested mode: The MAC-hs packet scheduler is not able to fulfill the guaranteed bit rates for all the allocated HSDPA-users. Whether GBR is set as real guaranteed bit rate or the minimum/target bit rate is irrelevant in this context.

The MAC-hs scheduler is expected to operate in the feasible load region which is ensured by Quality of Service (QoS) aware Admission Control (AC) and Load Control (LC); e.g. possible convergence of the Packet Scheduler (PS) is ensured over longer time. However instantaneous congestion will be experienced following the fast changing dynamics (due to e.g., user mobility, user location distribution in cell, and/or non static environment). A characteristic of many of the well-known and QoS-aware packet scheduler methods (including the barrier function packet scheduler as well as the Nokia required-activity-detection scheduler) is that when the scheduler is working in the congested area (also when it is just for a short period), the scheduling is determined primarily by the GBR requirements rather than the channel quality indication (which is the desired goal). However, more elaborate consideration of both characteristics of each user provides significant performance benefits over just using basic scheduling approaches and conduct the sorting. This has been seen in earlier studies (basic user filtering or so-called credit-system approaches which are implemented effectively as a two-step process with first hard and then soft prioritization). In this sense, the MAC-hs scheduling candidate set (SCS) is the set of HSDPA-users who are potential candidates to be scheduled in the next Transmission Time Interval (TTI). When the MAC-hs packet scheduler operates in the feasible load region, the SCS includes all the HSDPA-users that have data in their MAC-hs buffer and/or pending retransmissions in the Hybrid Automatic Repeat Request (HARQ) manager. If the MAC-hs scheduler starts to operate in the congested load region, the SCS could be modified by removing a certain number of users from the SCS until the scheduler can serve all the remaining HSDPA-users in the SCS. Which users and how many users to filter out from the SCS is a non trivial issue since it depends on the number of users with data buffered, on other user's QoS requirements, on the user's channel conditions and sustainable data rate.

In an earlier patent application "QoS-Aware Radio Resource Management (for Wireless Communication) With Activity Detection," it was found that by dynamically monitoring the scheduled transmit data rate as well as the required data rate from a QoS perspective, significant scheduling gain could be achieved over well-known reference schedulers from the open literature.

SUMMARY OF THE INVENTION

An embodiment of the invention is a device comprising: apparatus configured to perform overload control in aid of scheduling operations involving communications by a plurality of user equipment operative in a wireless communications network; to detect congestion in the wireless communications network by determining the operating region of a scheduler using a required activity detection principle; and when a congestion condition is detected, to perform prioritization of user equipment comprising a scheduling candidate set based on a cost associated with each user equipment.

Another embodiment of the invention is a method comprising: performing overload control in aid of scheduling operations involving communications by a plurality of user equipment operative in a wireless communications network; detecting a congestion condition in the wireless communications network by determining the operating region of a scheduler using a required activity detection principle; and when a congestion condition is detected performing prioritization of user equipment comprising a scheduling candidate set based on a cost associated with each user equipment.

A further embodiment of the invention is a computer program product comprising a computer readable memory medium embodying a computer program, wherein the computer program, when executed is configured to operate a device to perform overload control in aid of scheduling operations involving communications by a plurality of user equipment in a wireless communications network; to detect congestion in the wireless communications network by determining the operating region of a scheduler using a required activity detection principle; and when a congestion condition is detected, to perform prioritization of user equipment comprising a scheduling candidate set based on a cost associated with each user equipment.

Yet another embodiment of the invention is a device comprising: means for performing overload control in aid of scheduling operations involving communications by a plurality of user equipment in a wireless communications network; for detecting congestion in the wireless communications network by determining the operating region of a scheduler using a required activity detection principle; and when a congestion condition is detected, for performing prioritization of user equipment comprising a scheduling candidate set based on a cost associated with each user equipment.

DETAILED DESCRIPTION

Reference can be had to RAN07 MAC-hs Packet Scheduling Considerations for further background.

The exemplary embodiments of this invention provide specific fast instantaneous overload control for a wireless system with QoS and radio aware packet scheduling located in a Node-B. The concept adheres specifically to the 3rd Generation Partnership Project Wideband Code Division Multiple Access/ High-Speed Downlink Packet Access solution, but can be adopted for use in other systems, such as for QoS control in the long term evolution (LTE) of 3rd Generation Partnership Project Evolved Universal Mobile Telecommunications System Terrestrial Radio Access Network and for other similar fast-scheduling communication systems. In the public literature the main QoS control mechanisms on the radio interface are placed in the admission control (AC), load control (LC) and packet scheduler (PS). Their main targets in this respect are to keep the network load stable providing the required QoS and, if needed, recovering from the network overload condition to the normal load state as quickly as possible. In the traditional approach LC updates the cell load status based on radio resource measurements and estimations; in case of overload, some control actions are performed such as: AC blocks new calls, PS decreases non-real-time (NRT) bit rates in the cell, LC drops some existing calls.

The exemplary embodiments of this invention extend the basic RAD concept to the fast bearer prioritization domain. Differently from the typical LC actions such as dropping, this fast control is momentary and not permanent. A novel technique for building QoS awareness into a credit system is provided.

The exemplary embodiments provide a specific apparatus for fast bearer prioritization (FBP) by filtering the scheduling candidate set (also known as SCS filtering) in case congestion is detected by the MAC-hs packet scheduler. The exemplary embodiments have a multi-part framework:

A: Apparatus for detecting the instantaneous operating region of the MAC-hs scheduler based on the required activity detection (RAD) principle.

B: A mechanism for fast prioritization of users in the SCS based on cost of the user (implemented by combining part of RAD algorithm with a per-bearer cost function in the most general case). In a simplest case, one may limit the amount of users that suffer during momentarily congestion.

The framework is flexible and can incorporate e.g. the scheduling priority parameters and other cost related information related to bearers and service classes.

The fast bearer prioritization feature works independently of the scheduler family which is chosen for the system.

Figure 1:
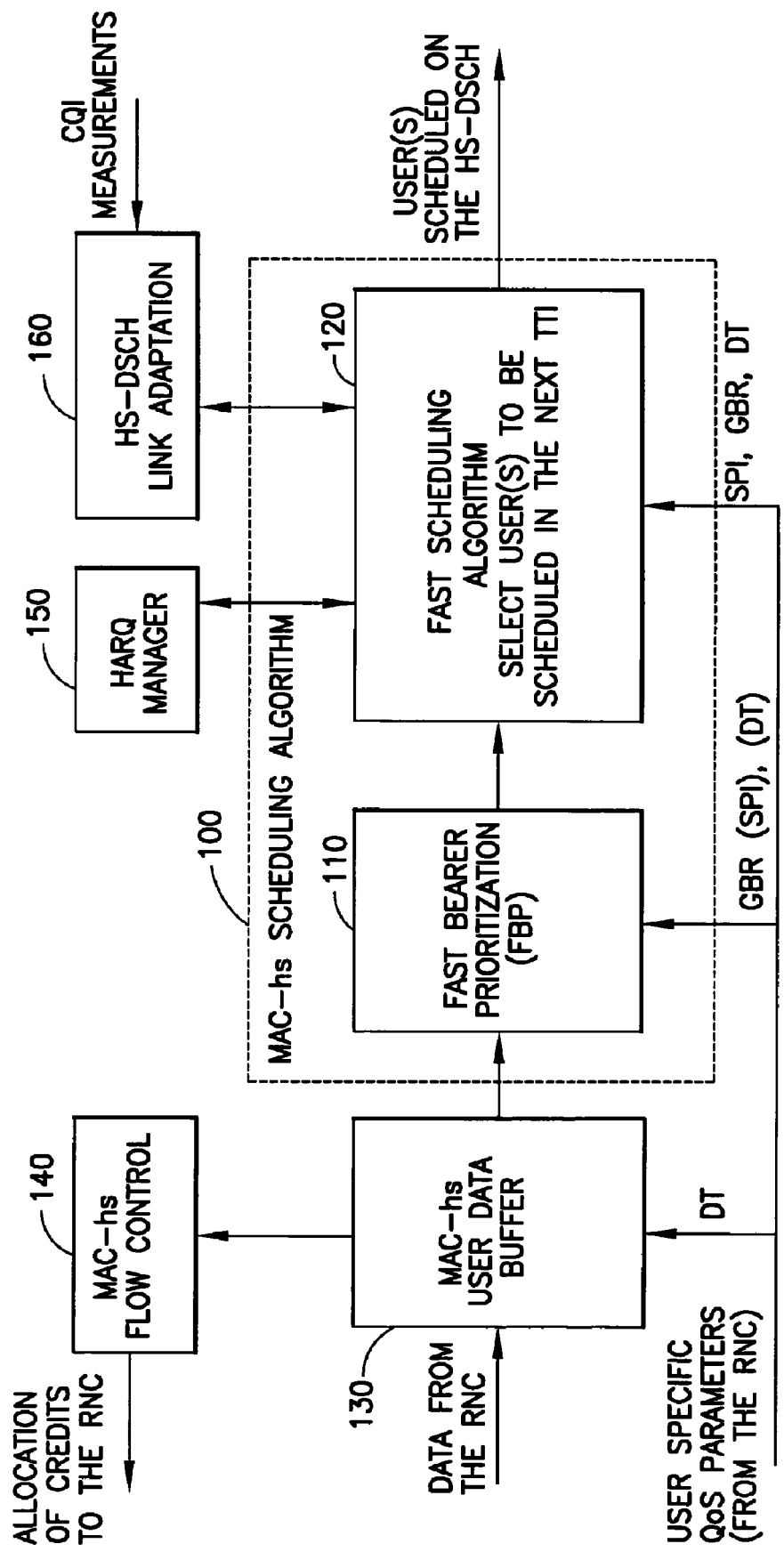
FIG. 1 illustrates a block diagram of MAC-hs functions. The FBP entity is placed within the MAC-hs packet scheduler functionality. The MAC-hs scheduler is responsible for TTI-based updating the SCS for each cell.

To illustrate the principle, reference is made to FIG. 1. In respect of the novel framework, the Fast Bearer Prioritization (FBP) feature is placed in the MAC-hs packet scheduler functionality. The MAC-hs scheduling algorithm 100 comprises a fast bearer prioritization portion 110 and fast scheduling algorithm portion 120. As is seen data from an RNC (radio network controller) enters the MAC-hs user data buffer 130. The fast bearer prioritization portion 110 and fast scheduling algorithm 120 of the MAC-hs scheduling algorithm 100 operate on the output of the MAC-hs user data buffer to determine user(s) scheduled for the HS-DSCH (high speed downlink shared channel). User specific QoS parameters (scheduling priority indicator (SPI), guaranteed bit rate (GBR) and discard timer (DT)) are received from the RNC and selectively supplied to the MAC-hs User Data Buffer 130, Fast Bearer Prioritization portion 110 and Fast Scheduling Algorithm portion 120. In performing operations the Fast Scheduling Algorithm interacts with the HARQ manager 150 and the HS-DSCH Link Adaptation control 160. The MAC-hs flow control 140 operates on output from the MAC-hs User Data Buffer 130 and generates allocation of credit information which is supplied to the RNC. The functionality is explained in greater detail below.

Required Activity Detection (RAD)

RAD forms the baseline for the method. Consider the scheduling candidate set (SCS):

$$SCS=\{1,\ldots,N\}.$$

Here, N is the number of UEs with data in their buffer or with retransmission to be scheduled and each UE in the SCS is denoted $UE_k$. For $UE_k$ the lowest acceptable bit rate (LABR) is indicated with $LABR_k$ and the average and measured scheduled throughput is denoted by $T_{sch,k}$. Note that LABR can be the GBR provided that this really means "guaranteed" or some offset based on outage and system considerations. It is up to the system to define and set this parameter based on knowledge of the "traditional" QoS parameters (e.g. SPI, GBR, Traffic Class (TC) . . . ). Mapping from delay critical services to LABR is also possible. $LABR_k$ may be set based on the guaranteed bit rate (GBR), and the required activity $\eta_k$ may be set based on the service priority indicator (SPI), but the fast bearer prioritization is independent on how the required activity $\eta_k$ is calculated, and the fast user prioritization is valid no matter how the required activity $\eta_k$ is calculated. LABR may be zero for strictly best-effort users where the system can afford having them "active" for long time without any throughput.

$T_{sch,k}$ considers the available and effective (including L1 error rate) data rate that can be given to the UE when transmitting data (e.g., measurement is masked when there is data in the buffer and the UE is actually scheduled). It thus adaptively incorporates the effects of multi-user diversity, user dynamics, etc. In the exemplary embodiments of this invention, $T_{sch,k}$ is updated every TTI (n) using an iterative averaging filter:

$$T_{sch,k,n}=T_{sch,k,n-1}, \text{ if the UE was not scheduled.}$$

$$T_{sch,k,n}=T_{sch,k,n-1}+(\text{acknowledgedbits}_{k,n}/2\text{ ms}-T_{sch,k,n-1})/K, \text{ if the UE was scheduled,}$$

where K is a filter length constant which is set to 30 in our simulations.

The RAD concept offers a method to detect the required UE activity to meet the QoS requirement defined as: $\eta_k=LABR_k/T_{sch,k}$ where the unit is "fraction of the total scheduling time".

Fast Bearer Prioritization (FBP)

The maximum total scheduling time is 100% (here assuming no multiplexing—otherwise it is adjusted by the number of bearers scheduled per TTI). This means that the following inequality should be fulfilled for the system to be able to serve all bearers with their set LABRs:

$$\Sigma_{k \in SCS}(\eta_k) \leq 1,$$

(Note that an analogue alternative is to update $T_{sch,k,n}$ in the following manner:

$$T_{sch,k,n} = T_{sch,k,n-1} + (\text{transmitted bits}_{k,n}/2 \text{ ms} - T_{sch,k,n-1})/K, \text{ if the UE was scheduled,}$$

and then use the adjusted inequality:

$$\Sigma_{k \in SCS}(\eta_k) \leq (1-BLER),$$

where the BLER is the Block Error Rate. The BLER target on the first transmission is typically 10%).

If this inequality is not fulfilled, then the system has an indication that it will not be able to provide the LABR to all UEs for the current system conditions (e.g. number of active users, service mix, multi-user diversity, etc.). From an implementation perspective, the scheduled throughput is an averaged value over some time and thus the "overload" indication is based on current slow-fading and user location conditions.

The RAD principle is herein used in order to conduct fast prioritization. The system deliberately chooses to prioritize a subsetSCS ⊆ SCS, where for that subsetSCS:

$$\Sigma_{k \in subsetSCS}(\eta_k) \leq 1.$$

This subsetSCS is input to the scheduler instead of the original SCS. This is an important aspect of the fast bearer prioritization.

Prioritizing the Bearers

The prioritization (sorting) of the bearers for inclusion in subsetSCS can be done in various ways accounting for QoS in order to protect higher priority users during congestion, and/or accounting for radio performance considerations to minimize the number of unsatisfied users. Here some non-limiting implementation examples are given.

Discarding the most expensive users (from a radio perspective) first: Letting subsetSCS contain the bearers with the lowest $\eta_k$ values will lead to the largest possible subsetSCS where the inequality still holds. Hence, this will make most users satisfied according to their LABR which is an attractive method when considering performance versus a cell outage target (and where outage probability in all user/bearer classes should be the same—although outage requirements can be very different for those classes).

Discarding based both on the lowest priority users (from a QoS perspective) and the most expensive users (from a radio perspective): Provided that the acceptable outage for some users can be higher, we can define a utility function for each UE and weight the $\eta_k$ values with the utility to conduct the sorting; e.g. we minimize the system cost of the outage. Such utility function can be a function of e.g. the SPI parameter defined in WCDMA/HSDPA and other parameters.

Maximizing system capacity: One could define approaches where the users with highest scheduled throughput are served first in order to increase the system capacity and other similar variants.

Adding the Excluded Bearers Back to the subsetSCS

The excluded users will be added back to the SCS as the congestion recovers. Note that some services running over e.g., Transmission Control Protocol (TCP) protocol may require some special attention. E.g., to avoid total starvation and TCP timeouts a user could be periodically admitted in the subsetSCS during congestion or could be kept with a (temporarily) reduced LABR value. As the average delivered throughput is updated for all users within the complete SCS (not only within the subsetSCS), bearers excluded from the subsetSCS for some time window will have a higher probability to be scheduled when included again in the subsetSCS. For the same reason, bearers which are temporarily out of range (Channel Quality Indicator, CQI=0) must have their average delivered throughput values updated as well.

Implementation Complexity

Due to the prioritization (sorting) of the UEs for inclusion into the subsetSCS, the computational complexity of the implementation from a straightforward implementation would be in the order to N*log(N). But since from one TTI to the next most of the $T_{sch,k}$ are unchanged (since the UEs have not been scheduled), then one may simply reposition the scheduled UE (or UEs in case of multiplexing) into the already sorted list, which brings the computational complexity down to be in the order of N.

Performance Results

Figure 2A:
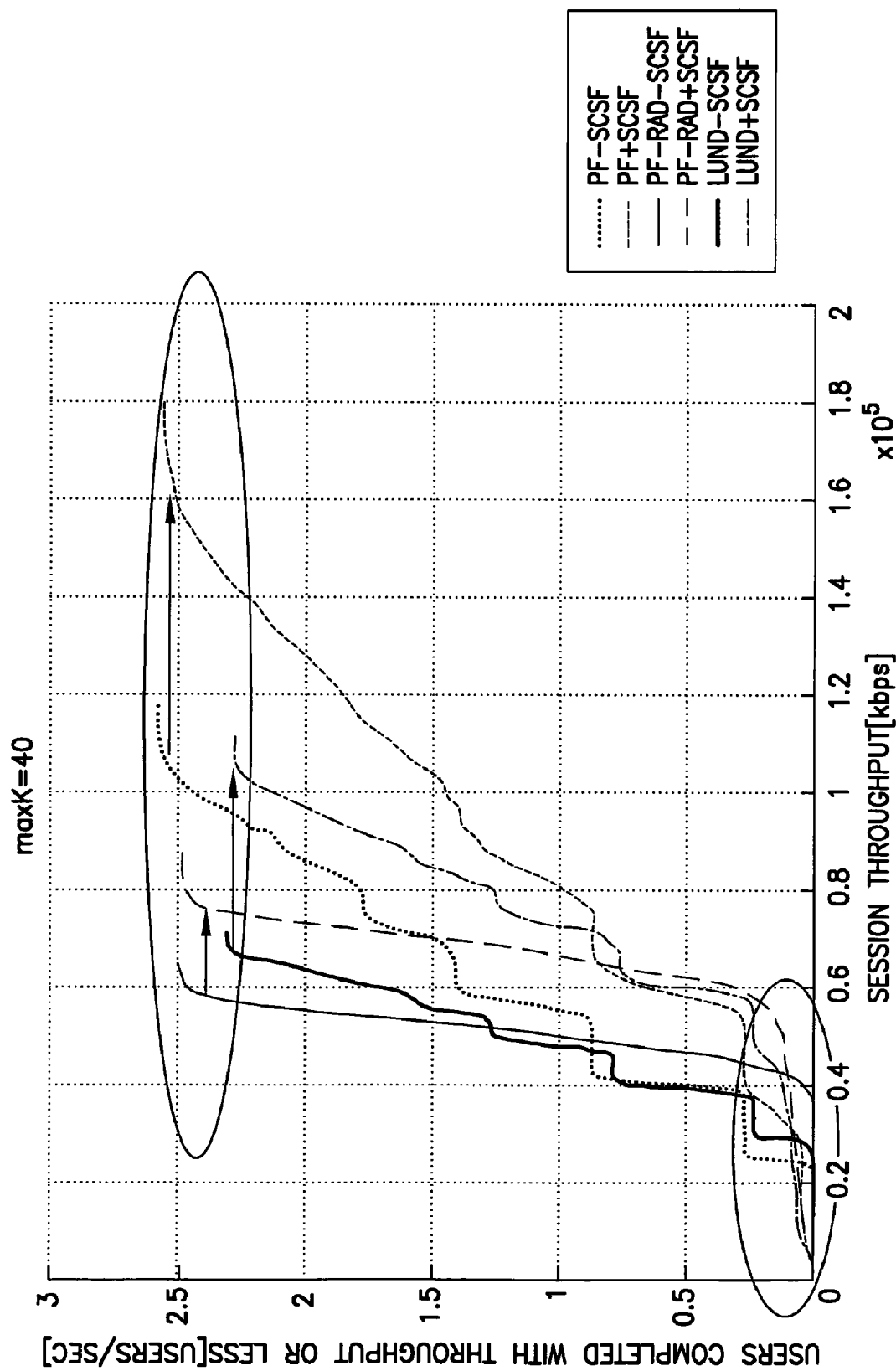
FIGS. 2A, 2B and 2C, collectively referred to as FIG. 2, illustrate the benefits of the FBP mechanism via network simulations for Proportional Fair (PF), Proportional Fair with Required Activity Detection (PF-RAD) and Proportional Fair with Barrier Function (LUND). The functionality greatly reduces the user impact caused by temporary congestion thus a higher user throughput is provided to the remaining users.
Figure 2B:
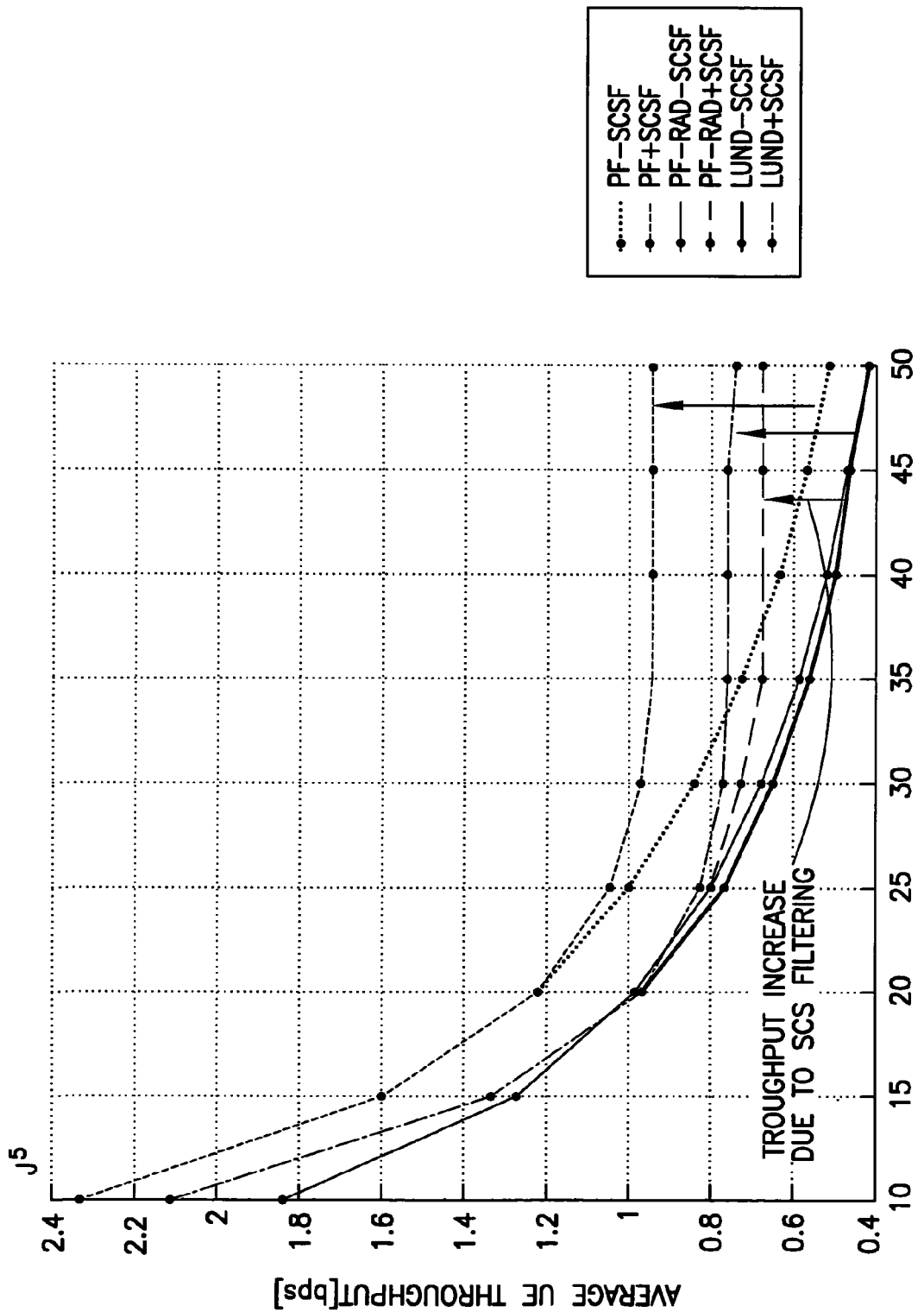
Figure 2C:
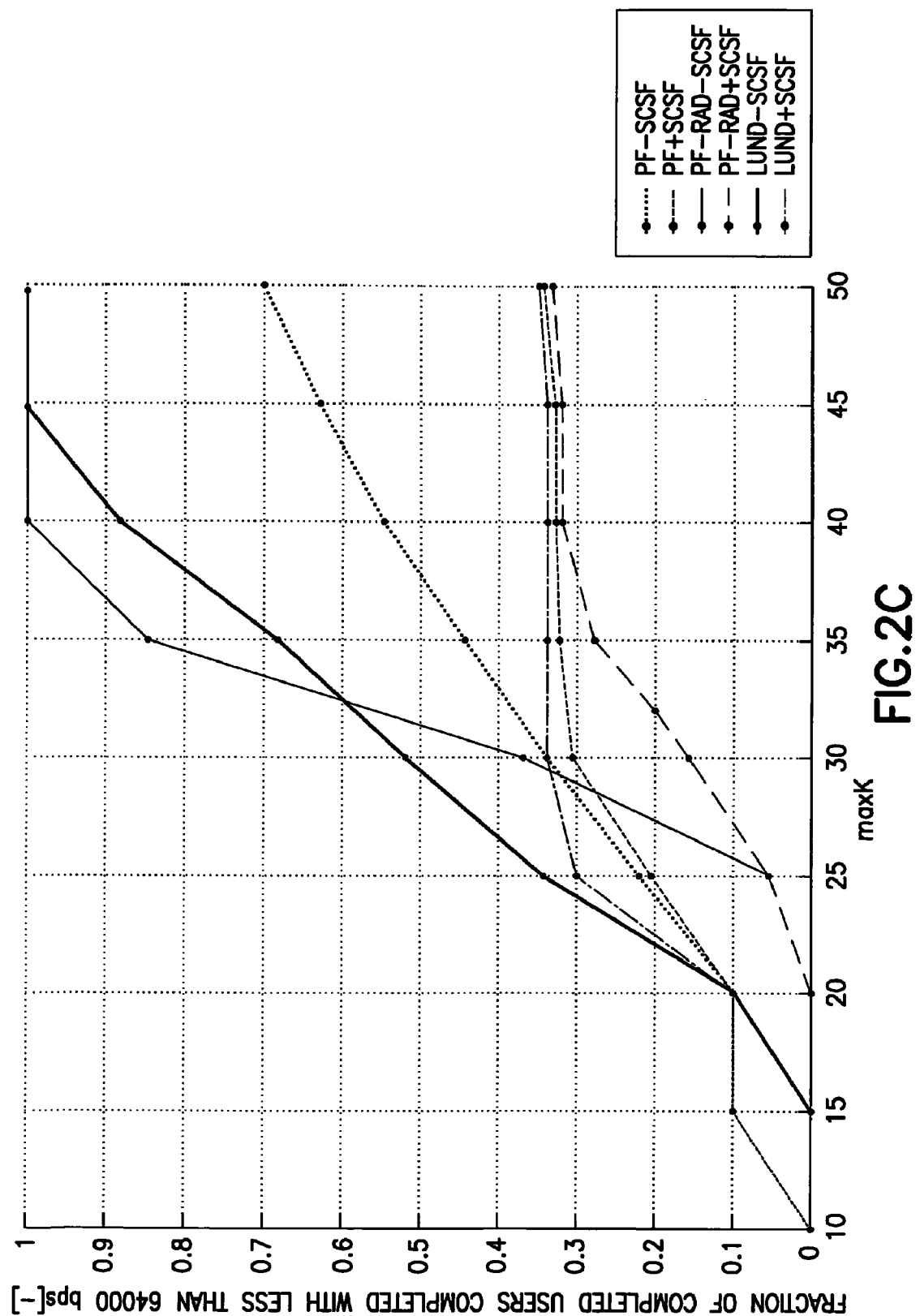

FIG. 2 shows the benefits that the FBP functionality yields in terms of the session throughput, the average user throughput, and fraction of users with less than 64 kbps (the GBR in this case). The gain is quite significant as the cell load increases and significant gain is sustained for all the known packet scheduler families.

A number of advantages are realized by the use of the exemplary embodiments of this invention. These include, but need not be limited to, the following.

The method provides significant gain when combined with known QoS and radio-aware scheduling concepts (see results), as there is reduced outage for GBR users and a larger cell capacity overall is achieved.

The framework is flexible and allows different degrees of complexity, (i.e., fast prioritization may be performed very simply or scaled to include cost functions determined by the operator). The exemplary embodiments may utilize existing QoS parameters such as SPI.

The technique can be based on the same robust estimation methods as are known from the basic proportional fair scheduling principle.

Further, the complexity needed for the FBP can be re-used when implementing, for example, the RAD packet scheduler.

In general, the various embodiments of the UE can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the 3GPP WCDMA/HSDPA system, it should be appreciated that the exemplary embodiments of this invention are not limited for use with only this one particular type of wireless communication system, and that they may be used to advantage in other wireless communication systems such as the E-UTRAN (UTRAN-LTE) system.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   a processor; and
   a memory including computer program code,
   wherein the memory and the computer program code are configured, with the processor, to cause the apparatus to perform overload control in aid of scheduling operations involving communications by a plurality of user equipment operative in a wireless communications network; to detect a congestion condition in the wireless communications network by determining an operating region of a scheduler using an activity detection principle for a scheduling candidate set; and
   when the congestion condition is detected, to perform prioritization of user equipment in the scheduling candidate set based on a cost associated with each user equipment, wherein the prioritization comprises performing fast bearer prioritization through filtering the user equipment in the scheduling candidate set that are seeking to perform communications operations in the wireless communications network, where filtering uses at least one predetermined criterion;
   wherein the fast bearer prioritization operates according to a framework that combines an activity detection approach with a per-bearer cost function when making prioritization decisions.

2. The apparatus of claim 1 wherein the wireless communications network comprises a 3rd generation partnership project wideband code division multiple access/ high-speed downlink packet access wireless communications network.

3. The apparatus of claim 1 wherein the wireless communication network comprises a long term evolution of a 3rd generation partnership project evolved universal mobile telecommunications system terrestrial radio access network wireless communications network.

4. The apparatus of claim 1 wherein the scheduler comprises a medium access control high speed packet scheduler.

5. The apparatus of claim 1 wherein the apparatus is configured to perform the prioritization of user equipment while congestion persists.

6. The apparatus of claim 5 wherein the prioritization of user equipment does not result in dropping any user equipment performing communication operations.

7. The apparatus of claim 5 wherein the prioritization of user equipment maintains a desired level of service for certain user equipment and reduces a level of service accorded to other user equipment.

8. The apparatus of claim 1 wherein the processor is configured to detect that the congestion in the wireless communications network has subsided and to discontinue performing prioritization of user equipment regarding scheduling of wireless communications network resources.

9. The apparatus of claim 1, wherein the framework incorporates at least one of scheduling priority parameters and cost-related information related to bearers and service classes.

10. The apparatus of claim 9 wherein the fast bearer prioritization excludes at least some of most costly user equipment from the scheduling candidate set, wherein the user equipment are most costly from a wireless communications resource demand perspective.

11. The apparatus of claim 9 wherein the fast bearer prioritization excludes at least some of least costly user equipment from the scheduling candidate set, wherein the user equipment are least costly from a wireless communications resource demand perspective.

12. The apparatus of claim 1 wherein the fast bearer prioritization filters the scheduling candidate set in such a manner as to meet a pre-determined system capacity criterion.

13. The apparatus of claim 12 wherein the pre-determined system capacity criterion comprises maximizing system capacity.

14. The apparatus of claim 13 wherein maximizing system capacity is achieved by selecting user equipment in order of highest scheduled throughput.

15. A method comprising:
   performing overload control in aid of scheduling operations involving communications by a plurality of user equipment operative in a wireless communications network;
   detecting a congestion condition in the wireless communications network by determining an operating region of a scheduler using an activity detection principle for a scheduling candidate set; and
   when the congestion condition is detected, performing prioritization of user equipment comprising the scheduling candidate set based on a cost associated with each user equipment,
   wherein the prioritization comprises performing fast bearer prioritization through filtering the user equipment in the scheduling candidate set that are seeking to perform communications operations in the wireless communications network, where filtering uses at least one predetermined criterions;
   wherein the fast bearer prioritization operates according to a framework that combines an activity detection approach with a per-bearer cost function when making prioritization decisions.

16. The method of claim 15 wherein the wireless communications network comprises a 3rd generation partnership project wideband code division multiple access/ high-speed downlink packet access wireless communications network.

17. The method of claim 15 wherein the wireless communication network comprises a long term evolution of a 3$^{rd}$ generation partnership project evolved universal mobile telecommunications system terrestrial radio access network wireless communications network.

18. The method of claim 15 wherein the scheduler comprises a medium access control high speed packet scheduler.

19. The method of claim 15 further comprising performing the prioritization of user equipment while congestion persists.

20. The method of claim 19 wherein the prioritization of user equipment does not result in dropping any user equipment performing communication operations.

21. The method of claim 19 wherein the prioritization of user equipment maintains a desired level of service for certain user equipment and reduces a level of service accorded to other user equipment.

22. The method of claim 15 further comprising detecting that the congestion in the wireless communications network has subsided and discontinuing performing prioritization of user equipment regarding scheduling of wireless communications network resources.

23. The method of claim 15 wherein the framework incorporates at least one of scheduling priority parameters and cost-related information related to bearers and service classes.

24. The method of claim 15 wherein the fast bearer prioritization excludes at least some of most costly user equipment from the scheduling candidate set, wherein the user equipment are most costly from a wireless communications resource demand perspective.

25. The method of claim 15 wherein the fast bearer prioritization excludes at least some of least costly user equipment from the scheduling candidate set, wherein the user equipment are least costly from a wireless communications resource demand perspective.

26. The method of claim 15 wherein the fast bearer prioritization filters the scheduling candidate set in such a manner as to meet a pre-determined system capacity criterion.

27. The method of claim 26 wherein the pre-determined system capacity criterion further comprises maximizing system capacity.

28. The method of claim 27 wherein maximizing system capacity is achieved by selecting user equipment in order of highest scheduled throughput.

29. A non-transitory computer readable memory medium embodying a computer program, wherein the computer program, when executed is configured to operate a device to perform overload control in aid of scheduling operations involving communications by a plurality of user equipment in a wireless communications network; to detect a congestion condition in the wireless communications network by determining an operating region of a scheduler using an activity detection principle for a scheduling candidate set; and when the congestion condition is detected, to perform prioritization of user equipment comprising the scheduling candidate set based on a cost associated with each user equipment, wherein the prioritization comprises performing fast bearer prioritization through filtering the user equipment in the scheduling candidate set that are seeking to perform communications operations in the wireless communications network, where filtering uses at least one predetermined criterion;

wherein the fast bearer prioritization operates according to a framework that combines an activity detection approach with a per-bearer cost function when making prioritization decisions.

30. An apparatus comprising:

means for performing overload control in aid of scheduling operations involving communications by a plurality of user equipment in a wireless communications network;

means for detecting congestion in the wireless communications network by determining an operating region of a scheduler using an activity detection principle for a scheduling candidate set; and means for performing prioritization of user equipment comprising the scheduling candidate set based on a cost associated with each user equipment when a congestion condition is detected, wherein the prioritization comprises performing fast bearer prioritization through filtering the user equipment in the scheduling candidate set that are seeking to perform communications operations in the wireless communications network, where filtering uses at least one predetermined criterion;

wherein the fast bearer prioritization operates according to a framework that combines an activity detection approach with a per-bearer cost function when making prioritization decisions.

* * * * *